(12) United States Patent
Ganin et al.

(10) Patent No.: US 12,518,128 B2
(45) Date of Patent: Jan. 6, 2026

(54) GENERATIVE NEURAL NETWORK SYSTEMS FOR GENERATING INSTRUCTION SEQUENCES TO CONTROL AN AGENT PERFORMING A TASK

(71) Applicant: DeepMind Technologies Limited, London (GB)

(72) Inventors: Iaroslav Ganin, Montreal (CA); Tejas Dattatraya Kulkarni, London (GB); Oriol Vinyals, London (GB); Seyed Mohammadali Eslami, London (GB)

(73) Assignee: DeepMind Technologies Limited, London (GB)

( * ) Notice: Subject to any disclaimer, the term of this patent is extended or adjusted under 35 U.S.C. 154(b) by 1373 days.

(21) Appl. No.: 16/967,597

(22) PCT Filed: Feb. 11, 2019

(86) PCT No.: PCT/EP2019/053295
§ 371 (c)(1),
(2) Date: Aug. 5, 2020

(87) PCT Pub. No.: WO2019/155052
PCT Pub. Date: Aug. 15, 2019

(65) Prior Publication Data
US 2021/0271968 A1    Sep. 2, 2021

Related U.S. Application Data

(60) Provisional application No. 62/628,867, filed on Feb. 9, 2018.

(51) Int. Cl.
*G06N 20/00*    (2019.01)
*G06F 18/214*    (2023.01)
(Continued)

(52) U.S. Cl.
CPC .......... *G06N 3/006* (2013.01); *G06F 18/2148* (2023.01); *G06F 30/20* (2020.01);
(Continued)

(58) Field of Classification Search
CPC ........... G06N 3/006; G06N 3/044; G06N 3/08
See application file for complete search history.

(56) References Cited

U.S. PATENT DOCUMENTS 10,396,919 B1 *  8/2019  O'Shea ............... H04L 25/0254
10,766,136 B1 *  9/2020  Porter .................... G06N 3/045
(Continued)

FOREIGN PATENT DOCUMENTS

CN    108830827    11/2018
CN    109313724    2/2019

OTHER PUBLICATIONS

Wierstra, D., Schmidhuber, J. "Policy Gradient Critics." 2007. Machine Learning: ECML 2007, vol. 4701. https://doi.org/10.1007/978-3-540-74958-5_43, pp. 466-477. (Year: 2007).*
(Continued)

*Primary Examiner* — David R Vincent
(74) *Attorney, Agent, or Firm* — Fish & Richardson P.C.

(57) ABSTRACT

Methods, systems, and apparatus for providing a sequence of actions to perform a task. In one aspect, a method comprises: using a policy neural network to, at each of a sequence of time steps, select one or more actions to be performed according to an action selection policy learned by the policy neural network; providing the selected one or more actions to a simulator; implementing the selected one or more actions for the time steps using the simulator to generate a simulator output; discriminating between the simulator output and training data using a discriminator neural network to produce a discriminator output; and updating parameters of the policy recurrent neural network
(Continued)

using a reinforcement learning procedure according to a reward signal determined from the discriminator output; and updating parameters of the discriminator neural network according to a difference between the simulator output and the training data.

20 Claims, 9 Drawing Sheets

(51) Int. Cl.
*G06F 30/20* (2020.01)
*G06N 3/006* (2023.01)
*G06N 3/044* (2023.01)
*G06N 3/08* (2023.01)

(52) U.S. Cl.
CPC .............. *G06N 3/044* (2023.01); *G06N 3/08* (2013.01); *G06N 20/00* (2019.01)

(56) References Cited

U.S. PATENT DOCUMENTS

| | | | | |
|---|---|---|---|---|
| 10,926,408 | B1* | 2/2021 | Vogelsong | B25J 9/163 |
| 11,475,276 | B1* | 10/2022 | Shrivastava | G06N 3/094 |
| 2017/0228662 | A1* | 8/2017 | Gu | G06N 3/045 |
| 2018/0349527 | A1* | 12/2018 | Li | G06N 3/08 |
| 2019/0130278 | A1* | 5/2019 | Karras | G06V 10/82 |
| 2019/0149425 | A1* | 5/2019 | Larish | G06N 3/045 |
| | | | | 706/16 |
| 2020/0065673 | A1* | 2/2020 | Huang | G06N 3/047 |
| 2020/0081982 | A1* | 3/2020 | Tu | G06N 3/047 |
| 2020/0114506 | A1* | 4/2020 | Toshev | G05B 13/027 |

OTHER PUBLICATIONS

Gregor, Karol, et al. "Draw: A Recurrent Neural Network for Image Generation." May 20, 2015, arxiv.org/abs/1502.04623, 10 pgs. (Year: 2015).*
Heess, Nicolas, et al. "Memory-Based Control with Recurrent Neural Networks." Dec. 14, 2015, arxiv.org/abs/1512.04455, 11 pgs. (Year: 2015).*
Jaderberg, Max, et al. "Reinforcement Learning with Unsupervised Auxiliary Tasks." Nov. 16, 2016, arxiv.org/abs/1611.05397, 14 pgs. (Year: 2016).*
Yu, Lantao, et al. "SeqGAN: Sequence Generative Adversarial Nets with Policy Gradient." Sep. 18, 2016, arxiv.org/abs/1609.05473v1, 10 pgs. (Year: 2016).*
Mohamed, Shakir, and Balaji Lakshminarayanan. "Learning in Implicit Generative Models." Jan. 13, 2017, arxiv.org/abs/1610.03483v3, 11 pgs. (Year: 2017).*
Pfau, David, and Oriol Vinyals. "Connecting Generative Adversarial Networks and Actor-Critic Methods." Jan. 18, 2017, arxiv.org/abs/1610.01945, 10 pgs. (Year: 2017).*
Arjovsky, Martin, et al. "Wasserstein Gan." Jan. 26, 2017, arxiv.org/abs/1701.07875v1, 30 pgs. (Year: 2017).*
Gilles et al., "Adversarial Variational Optimization of Non-Differentiable Simulators," CoRR, Jul. 22, 2017, arXiv: 1707.07113v1, 8 pages.
Office Action in Chinese Appln. No. 201980008613.0, dated Mar. 14, 2023, 16 pages (with English translation).
Office Action in European Appln. No. 19704793.9, dated Mar. 13, 2023, 11 pages.
Ouyang et al.,"Generating Image Sequence from Description with LSTM Conditional GAN," CoRR, Jun. 8, 2018, arxiv.org/abs/1806.03027, 6 pages.
Bengio et al., "Generative adversarial nets," Advances in neural information processing systems, 2014, pp. 2672-2680.
Courville et al., "Adversarially learned inference," CoRR, Jun. 2016, arXiv:1606.00704, 18 pages.
Courville et al., "Improved training of wasserstein gans," Advances in neural information processing systems, 2017, pp. 5767-5777.
Dai et al., "Towards diverse and natural image descriptions via a conditional GAN," Proceedings of the IEEE International Conference on Computer Vision, Oct. 2017, pp. 2989-2998.
Darrell et al., "Adversarial feature learning," CoRR, May 2016, arXiv:1605.09782, 18 pages.
Eck et al., "A neural representation of sketch drawings," CoRR, Apr. 2017, arxiv.org/abs/1704.03477, 15 pages.
Efros et al., "Image-to-image translation with conditional adversarial networks," Proceedings of the IEEE conference on computer vision and pattern recognition, 2017, pp. 1125-1134.
Ermon et al., "Generative adversarial imitation learning," Advances in neural information processing systems, 2016, pp. 4565-4573.
Espeholt et al., "Impala: Scalable distributed deep-RL with importance weighted actor-learner architectures," CoRR, Feb. 2018, arXiv:1802.01561, 22 pages.
Fernando et al., "Population based training of neural networks," CoRR, Nov. 2017, arXiv:1711.09846, 21 pages.
Gershman et al., "Building machines that learn and think like people," Behavioral and brain sciences, 2017, 40(e253): 72 pages.
Ha et al., "A neural representation of sketch drawings," CoRR, Apr. 2017, arXiv:1704.03477, 15 pages.
Haffner et al., "Gradient-based learning applied to document recognition," Proceedings of the IEEE, Nov. 1998, 86(11):2278-324.
Hinton et al., "Attend, infer, repeat: Fast scene understanding with generative models," Advances in Neural Information Processing Systems, 2016, pp. 3225-3233.
Khosla et al., "Policy driven generative adversarial network for accented speech generation," ICLR, Jan. 2018, 11 pages.
Legg et al., "Impala: Scalable distributed deep-rl with importance weighted actor-learner architectures," CoRR, Feb. 2018, arXiv:1802.01561, 22 pages.
Lempitsky et al., "Unsupervised domain adaptation by backpropagation," International conference on machine learning, Jun. 2015, pp. 1180-1189.
Loper et al., "OpenDR: An approximate differentiable renderer," European Conference on Computer Vision, Sep. 2014, pp. 154-169.
Mansinghka et al., "Approximate bayesian image interpretation using generative probabilistic graphics programs," Advances in Neural Information Processing Systems, 2013, pp. 1520-1528.
Mansinghka et al., "Picture: A probabilistic programming language for scene perception," Proceedings of the IEEE conference on computer vision and pattern recognition, 2015, pp. 4390-4399.
Merel et al., "Learning human behaviors from motion capture by adversarial imitation," CoRR, Jul. 2017, arXiv:1707.02201, 12 pages.
Mirza et al., "Conditional generative adversarial nets," CoRR, Nov. 2014, arXiv:1411.1784, 7 pages.
Mnih et al., "Asynchronous methods for deep reinforcement learning," International conference on machine learning, Jun. 2016, pp. 1928-1937.
Nair et al., "Analysis-by-synthesis by learning to invert generative black boxes," International Conference on Artificial Neural Networks, Sep. 2008, pp. 971-981.
Nair et al., "Inferring motor programs from images of handwritten digits," Advances in neural information processing systems, 2006, pp. 515-522.
Oord et al., "Pixel recurrent neural networks," CoRR, Jan. 2016, arXiv:1601.06759, 11 pages.
Paysan et al., "A 3D face model for pose and illumination invariant face recognition," 2009 Sixth TEEE International Conference on Advanced Video and Signal Based Surveillance, Sep. 2009, pp. 296-301.
PCT International Preliminary Report on Patentability in International Appln. No. PCT/EP2019/053295, dated Aug. 20, 2020, 9 pages.
PCT International Search Report on Patentability in International Applu. No. PCT/EP2019/053295, dated Jun. 14, 2019, 15 pages.
Radford et al., "Unsupervised representation learning with deep convolutional generative adversarial networks," CoRR, Nov. 2015, arXiv:1511.06434, 16 pages.

(56) References Cited

OTHER PUBLICATIONS

Reed et al., "Parallel multiscale autoregressive density estimation," CoRR, Mar. 2017, arXiv:1703.03664, 16 pages.
Rezende et al., "One-shot generalization in deep generative models," CoRR, Mar. 2016, arXiv:1603.05106, 10 pages.
Salakhutdinov et al., "Reducing the dimensionality of data with neural networks," Science, Jul. 2006, 313(5786):504-7.
Sejnowski et al., "A learning algorithm for Boltzmann machines," Cognitive science, Jan. 1985, 9(1):147-69.
Sharma et al., "Csgnet: Neural shape parser for constructive solid geometry," Proceedings of the IEEE Conference on Computer Vision and Pattern Recognition, 2018, pp. 5515-5523.
Silver et al., "Mastering the game of Go without human knowledge," Nature, Oct. 2017, 550(7676):354-359.
Sutskever et al., "Sequence to sequence learning with neural networks," Advances in neural information processing systems, 2014, pp. 3104-3112.
Tang et al., "Deep learning face attributes in the wild," Proceedings of the IEEE international conference on computer vision, 2015, pp. 3730-3738.
Tenenbaum et al., "Deep convolutional inverse graphics network," Advances in neural information processing systems, 2015, pp. 2539-2547.
Tenenbaum et al., "Human-level concept learning through probabilistic program induction." Science, Dec. 2015, 350(6266):1332-8.
Tenenbaum et al., "Learning to infer graphics programs from hand-drawn images," Advances in neural information processing systems, 2018, pp. 6059-6068.
Todorov et al., "Mujoco: A physics engine for model-based control," 2012 IEEE/RSJ International Conference on Intelligent Robots and Systems, Oct. 2012, pp. 5026-5033.
Tung et al., "Adversarial inverse graphics networks: Learning 2d-to-3d lifting and image-to-image translation from unpaired supervision," The IEEE International Conference on Computer Vision (ICCV), Oct. 2017, pp. 4364-4372.
Vinyals et al., "Synthesizing programs for images using reinforced adversarial learning," CoRR, Apr. 2018, arXiv:1804.01118, 12 pages.
Welling et al., "Auto-encoding variational bayes," CoRR, Dec. 2013, arxiv.org/abs/1312.6114, 14 pages.
Wierstra et al., "Draw: A recurrent neural network for image generation," CoRR, Feb. 2015, arXiv:1502.04623, 10 pages.
Williams et al., "Simple statistical gradient-following algorithms for connectionist reinforcement learning," Machine learning, May 1992, 8(3-4):229-56.
Wu et al., "Learning to see physics via visual de-animation," Advances in Neural Information Processing Systems, 2017, pp. 153-164.
Wu et al., "Neural scene de-rendering," Proceedings of the IEEE Conference on Computer Vision and Pattern Recognition, 2017, pp. 699-707.
Xie et al., "Artist agent: A reinforcement learning approach to automatic stroke generation in oriental ink painting," IEICE Transactions on Information and Systems, May 2013, 96(5):1134-44.
Zhu et al., "Unpaired image-to-image translation using cycle-consistent adversarial networks," Proceedings of the IEEE international conference on computer vision, 2017, pp. 2223-2232.
Office Action in European Appln. No. 19704793.9, dated Apr. 29, 2024, 10 pages.
Gehler et al., "The informed sampler, A discriminative approach to bayesian inference in generative computer vision models," Computer Vision and Image Understanding, Jul. 2015, 136:32-44.
Office Action in Chinese Appln. No. 201980008613.0, dated Feb. 8, 2024, 15 pages (with English translation).
Office Action in Chinese Appln. No. 201980008613.0, dated Oct. 19, 2023, 15 pages (with English translation).

* cited by examiner

GENERATIVE NEURAL NETWORK SYSTEMS FOR GENERATING INSTRUCTION SEQUENCES TO CONTROL AN AGENT PERFORMING A TASK

CROSS-REFERENCE TO RELATED APPLICATION

This application is a National Stage Application under 35 U.S.C. § 371 and claims the benefit of International Application No. PCT/EP2019/053295, filed on Feb. 11, 2019, which claims priority to U.S. Provisional Application Ser. No. 62/628,867, filed on Feb. 9, 2018. The disclosure of the prior application is considered part of and is incorporated by reference in the disclosure of this application.

BACKGROUND

This specification relates to neural network systems that generate data items.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that generates sequences of actions, in particular control commands or instructions which constitute a form of program for performing a task. In implementations the sequence of instructions is used for controlling an agent, i.e. a simulator, such as graphics software for generating an image, or audio software for generating a sound such as speech, or a simulator configured to simulate operation of a mechanical or electromechanical agent. Once trained the system may be used to provide a sequence of instructions to control the same or another agent to perform the task e.g. in the real world.

According to a first aspect a generative adversarial neural network system, in particular to provide a sequence of actions for performing a task defined by training data, comprises a generator subsystem comprising a reinforcement learning neural network subsystem coupled to a simulator. The reinforcement learning neural network subsystem may comprise a policy recurrent neural network to, at each of a sequence of time steps, select one or more actions to be performed according to an action selection policy and provide the selected one or more actions to the simulator e.g. to one or more control inputs of the simulator. Such a control input may comprise a data input and/or an electrical or optical signal input and/or a mechanical control input. The simulator may be configured to implement the selected one or more actions for the time steps to generate a simulator output.

The generative adversarial neural network system may further comprise a discriminator neural network configured to discriminate between the simulator output and training data for the system and to provide a discriminator output. A training subsystem may be configured to update parameters of the policy recurrent neural network using a reinforcement learning procedure according to a reward signal determined from the discriminator output. The training subsystem may also be configured to update parameters of the discriminator neural network according to a difference between the simulator output and the training data.

In some implementations such a system allows a non-differentiable simulator to be used as part of the generator. Here non-differentiable means that it is not possible to back propagate a gradient from the simulator output to the simulator control input.

The simulator may be any system which is able to produce a data item or signal from a sequence of controlling actions, for example a CAD (Computer Aided Design) program to produce an image. The training data may be of the same type as the simulator output, for example an image which the CAD program is trying to reproduce.

In some implementations the policy recurrent neural network may receive an observation of the simulator output at each time step. For example where the simulator output comprises audio or image data such an observation may comprise the audio or image data from the simulator. Where the simulator output comprises the position, state or configuration of a simulated mechanical or electromechanical agent such an observation may comprise corresponding position, state or configuration data, or an observation of a simulated environment in which the mechanical or electromechanical agent acts, e.g. an image of this environment. Alternatively policy recurrent neural network may operate blind, that is without observation of the simulator output except at a final time step.

The reinforcement learning neural network subsystem may generate a sequence of N actions; each action may comprise a tuple of one or more selected actions, for example control commands for the simulator. The policy recurrent neural network of the reinforcement learning subsystem may receive from the simulator, as an input, intermediate results of the controlling actions, or it may act without such inputs.

The reward signal may comprise a determination by the discriminator of how close the simulator output is to the training data. For example the discriminator may be trained on a loss function dependent upon the first Wasserstein distance (Earth Mover distance) between the simulator output and training data distributions by sampling from the generator subsystem and training data. Thus the generator reinforcement learning neural network subsystem may learn to minimize this distance.

In the reinforcement learning neural network subsystem the actions may be selected from a predetermined set of actions for the simulator. The reinforcement learning neural network subsystem may implement an advantage actor-critic reinforcement learning technique. Thus this subsystem may include a value function or critic neural network to determine an estimated return, that is future reward, from taking an action recommended by the policy recurrent neural network according to an internal state of the policy recurrent neural network. An advantage of the action may be determined from a difference between the actual reward and the estimated return. The training subsystem may be configured to update the parameters of the policy recurrent neural network and parameters of the critic neural network using any of a variety of reinforcement learning algorithms. The parameters of the policy recurrent neural network may be updated using the estimated return from the critic neural network.

In some implementations the actors and learner(s) of the actor-critic reinforcement learning subsystem may be implemented by different workers in a distributed environment. Thus there may be a plurality of actors each comprising a copy of the policy recurrent neural network coupled to a respective simulator to generate a plurality of simulator outputs. The actors may pool their experience in an experience buffer. For example the actors may store trajectories from the simulator outputs in the experience buffer, each trajectory comprising a sequence of the one or more actions and corresponding simulator output. One or more learners may then employ off-policy learning to update the parameters of the policy recurrent neural network using the stored trajectories. Each actor may update its policy network from the latest learner policy. A suitable algorithm off-policy learning algorithm is described in the paper by L. Espeholt et al., "IMPALA: Scalable Distributed Deep-RL with Importance Weighted Actor-Learner Architectures".

A reinforcement learning procedure may, in addition to learning based on the reward signal, provide a bonus to the reward to encourage exploration and discourage premature convergence, also as described in Espeholt et al. Additionally or alternatively exploration may be driven by a search such as a tree search.

In some implementations the reinforcement learning neural network subsystem may include a replay buffer to store the simulator output. Then the discriminator neural network may be configured to sample from the replay buffer to provide the discriminator output. In this way the discriminator neural network may be updated more frequently than the generator subsystem, which can be advantageous.

The reward signal for the reinforcement learning neural network subsystem may be determined from the discriminator neural network when a simulation is complete, for example after a defined N steps. However one or more intermediate reward signals may also be generated. For example the reward signal may include an auxiliary reward (or penalty) dependent upon the selected one or more actions, to encourage (or discourage) particular behavior.

The policy recurrent neural network may generate actions based on a random initialization and/or may have an input to receive a target vector defining a target for the simulator output. The one or more actions may then be selected conditionally upon the target vector. The target vector may be of the same modality as the simulator output—for example both may be image data or both may be sound data in which case the target vector may be an example of the same data type as the training data, and may be used as training data for the discriminator. Additionally or alternatively the target vector may include data of a different type to the training data, for example text data describing an image or to be converted into sound, or motion control data for controlling a machine. For example images from one domain, for example a sketched image or segmented image, may be converted into another domain, for example a full color graphical example of the image.

In some implementations the simulator comprises a programmable signal generator. The programmable signal generator may generate a signal such as an image or image sequence or a sequence of values for an audio signal waveform such as speech or music, or a signal for controlling a machine such as a robot or autonomous vehicle. The selected one or more actions for the sequence of time steps may comprise programming actions to control the programmable signal generator to provide a simulator output comprising a signal generated according to the programming actions.

For example the simulator may comprise a CAD or other drawing program and the actions may comprise actions to select, configure and place CAD elements or actions to select brushes, strokes and the like. Alternatively the simulator may comprise a graphical rendering system and the actions may comprise scene data for rendering a graphical scene as an image. Alternatively the simulator may comprise a voice or music synthesizer and the actions, i.e. control commands, may comprise commends to program the synthesizer to produce a vocalizations or music, for example conditioned on a target vector as previously described. For example the control commands may be commands for a text-to-speech system which control parameters of a speech synthesizer conditioned upon units of text input, such as words, graphemes, or characters, to generate corresponding audio. The training data may comprise desired image or audio output data.

Alternatively the simulator may comprise a robot or vehicle simulator and the actions may comprise actions to control the simulator to perform a task. In general the system may be configured to implement an inverse simulator i.e. to determine control commands when given a specified response e.g. of a land vehicle or aircraft. Control commands may comprise, for example, motor control data; torque control data e.g. for a control surface; position, velocity, or force/torque/acceleration data for one or more joints of a robot or parts of another mechanical agent; and other data. The training data may comprise desired agent response output data e.g. for a robot arm or vehicle path.

Alternatively the simulator may comprise a drug design simulator to generate sample drug candidates according to a sequential set of program steps, with the aim of designing drugs having an activity against disease which is similar to drugs in a training set. Thus the simulator may comprise a computer program configured to simulate assembly of a molecule, e.g. by assembling atoms or molecular fragments or by assembling elements of secondary structure e.g. of a protein. Again the actions may then comprise control commands for the computer program e.g. to control placement and/or orientation of component parts of the molecule (drug). The training data may comprise example molecule (drug) structures which the system may learn to provide instructions to generate. It may then be provided with a new target and generate instructions for assembling this new target, either in a simulated environment or in the real world e.g. for automatic synthesis of the molecule.

Alternatively the simulator may comprise a simulator of a plant or service facility, simulating the response of the facility to control commands for items of equipment in the facility, for example to control operating speed or resource consumption. The simulator output may represent one or more behaviors of the system e.g. specified in terms of a set of system operating parameters. The system may learn to provide instructions to achieve these behaviors and, when trained, may then provide instructions for achieving a new, target behavior, i.e. behaving to achieve a different set of operating parameters.

In general the system may be used with any simulator which takes as input a sequence of program steps and provides an output, including in general a computer program implemented on one or more computer systems.

An output from the system may comprise the simulator output, for example image, sound and so forth and/or the output may comprise the sequence of actions employed to generate the simulator output. For example this may comprise a sequence of commands to generate a CAD drawing of an object given an image or description of the object, or more generally a program for the simulator to generate the simulator output. Thus, for example, the system may be provided with one or more target images, e.g. one or more photographs, and may generate CAD commands to produce a CAD rendering of the target image. In this way the one or more photographs may be converted to an engineering-style representation of the photographed object or structure, which may be useful for planning or other purposes.

Generative models have many applications in machine learning and control systems. For example predicted data items generated by the system may correspond to predicted observations and may be used in a control task in a real or simulated environment to predict the outcome of a planned action in the environment. The predictions may be learned from observations derived from one or more sensors; a predicted data item may comprise data generated as if from the sensor(s) at a future time. A predicted data item may be used to fill in missing data, or in semi-supervised learning where labels are only available for a few data items, or to provide multi-modal data outputs, or to map from one domain to another. More generally the predicted data items may comprise data such as audio data, still or moving image data, data defining the state or motion of an object, medical data such as biomarker data, spatio-temporal data relating to physical and/or chemical processes, and so forth.

In another aspect there is provided a method of training a generative adversarial neural network system, the method comprising jointly training a discriminator to discriminate between generated samples from a generator and training samples from a training data set, and training the generator to produce generated samples which appear similar to the training samples to the discriminator. Training the generator comprises training a reinforcement learning system to provide a sequence of actions to control a simulator to produce the generated samples, and using an output of the discriminator to provide a reward signal for the reinforcement learning.

The discriminator neural network is used during training of the system, and in particular training of the policy recurrent neural network, but it may be discarded after training as then only the generator subsystem may be needed.

In a further aspect a method of iteratively generating an image, or other data item, comprises using a policy recurrent neural network to, at each of a sequence of time steps, select one or more actions to be performed according to an action selection policy learned by the policy recurrent neural network, and providing the one or more actions to a simulator to control the simulator to implement the actions and provide a simulator output.

In some implementations the simulator comprises a simulator to generate a simulated image using simulator commands which control the simulator, the simulator commands comprise the actions selected by the policy recurrent neural network, and the simulator output comprises the simulated image. For example the simulator commands may provide a description of the simulated object or scene to the simulator in terms of the actions. Thus the actions may comprise, for example, painting actions of a painting program, or CAD actions of a CAD program, or rendering actions of a rendering program.

In addition to the above described advantages particular embodiments of the subject matter described in this specification can be implemented so as to realize one or more of the following further advantages.

The generative adversarial neural network systems described in this specification can learn to perform tasks which conventional generative systems are unable to perform because conventional systems require the generator component to be differentiable which limits its applicability. Thus for example the generative adversarial neural network system described in this specification can learn to control a simulation system which is separate from and potentially external to the neural networks of the generative system, for example an off the shelf simulation program or a computer-based simulation system controlled by keystrokes.

The generative adversarial neural network systems described in this specification can also perform some of the same tasks as conventional systems but with better performance i.e. more accurate or natural predicted output data. The described systems learn to exploit a simulator to control performance of a task and this also enables the model to provide an explanation of how the task is performed in terms of the actions used to control the simulator. This can improve confidence in the output, and can have independent utility, for example allowing the system to imagine the actions needed to control a machine to make it behave in a particular way. The system is also able to learn fast on challenging real-world and synthetic datasets, and to operate in complex environments, and hence may consume fewer computational resources, such as memory resources and computing power, than conventional approaches.

Implementations of the described system require that complex behaviors, such as those required to produce an image, generate a sound, or control a vehicle or robot, are represented as a sequence of actions, that is sets of control commands, which are used for generating the behavior. Thus they may require that the control commands or instructions are semantically meaningful as regards the behavior. This in turn implies that they may form a more compressed, data efficient representation of the final output e.g. from the simulator. Such a representation may be stored and/or transmitted with reduced memory and bandwidth requirements. In addition this may also make it easier to modify the instructions in order to modify the final output, for example to adapt the output to a particular task and or for output prediction in a control loop. Still further, the instructions may themselves be meaningful to humans, thus making the behavior of the system and/or of the trained reinforcement learning neural network subsystem more intelligible. This may be useful in, e.g. explaining the behavior of an autonomous vehicle or robot, and may potentially facilitate interventions or the application of safety constraints.

A problem with existing generative systems is that they can be very data hungry, and often waste capacity on representing minutiae of the training data set. It is also difficult to inject prior knowledge about the data into the system. The techniques described herein use tools, e.g. the simulator, to address these problems. In this way much more efficient usage of memory and processing capability can be achieved, and useful inductive biases may also be encoded into the system.

In general the techniques described herein are advantageously applicable to a wide range of tasks where the task can be performed by a tool or other entity under the control of a sequence of instructions.

BRIEF DESCRIPTION OF THE DRAWINGS

Like reference numbers and designations in the various drawings indicate like elements.

DETAILED DESCRIPTION

This specification generally describes a generative neural network system implemented as computer programs on one or more computers in one or more locations. The system generates a sequence of actions i.e. control commands for controlling an agent to perform a task such as generating an image, sound, or 2D or 3D design, or controlling a robot or land, sea or air vehicle. The sequence of actions may constitute a program, that is a series of instructions composed of discrete symbols or commands for controlling actions of a simulator e.g. a CAD program, or of a mechanical or electromechanical agent. The system includes a reinforcement learning neural network subsystem and, during training, a discriminator neural network which aims to discriminate between an output of the task, such as a generated image, and training data, such as an example image. In implementations an output of the discriminator neural network is used as a reward signal for the reinforcement learning neural network subsystem. Thus implementations of the system employ reinforcement learning in an adversarial context, and are able to learn without supervision. There is no requirement for the simulator or mechanical agent to be differentiable in the sense of allowing back propagation of a gradient of a loss function. Generating a "program" for controlling the agent tends to result in capturing a underlying semantic structure of the task, that is the instructions of the program tend to be meaningful.

Figure 1:
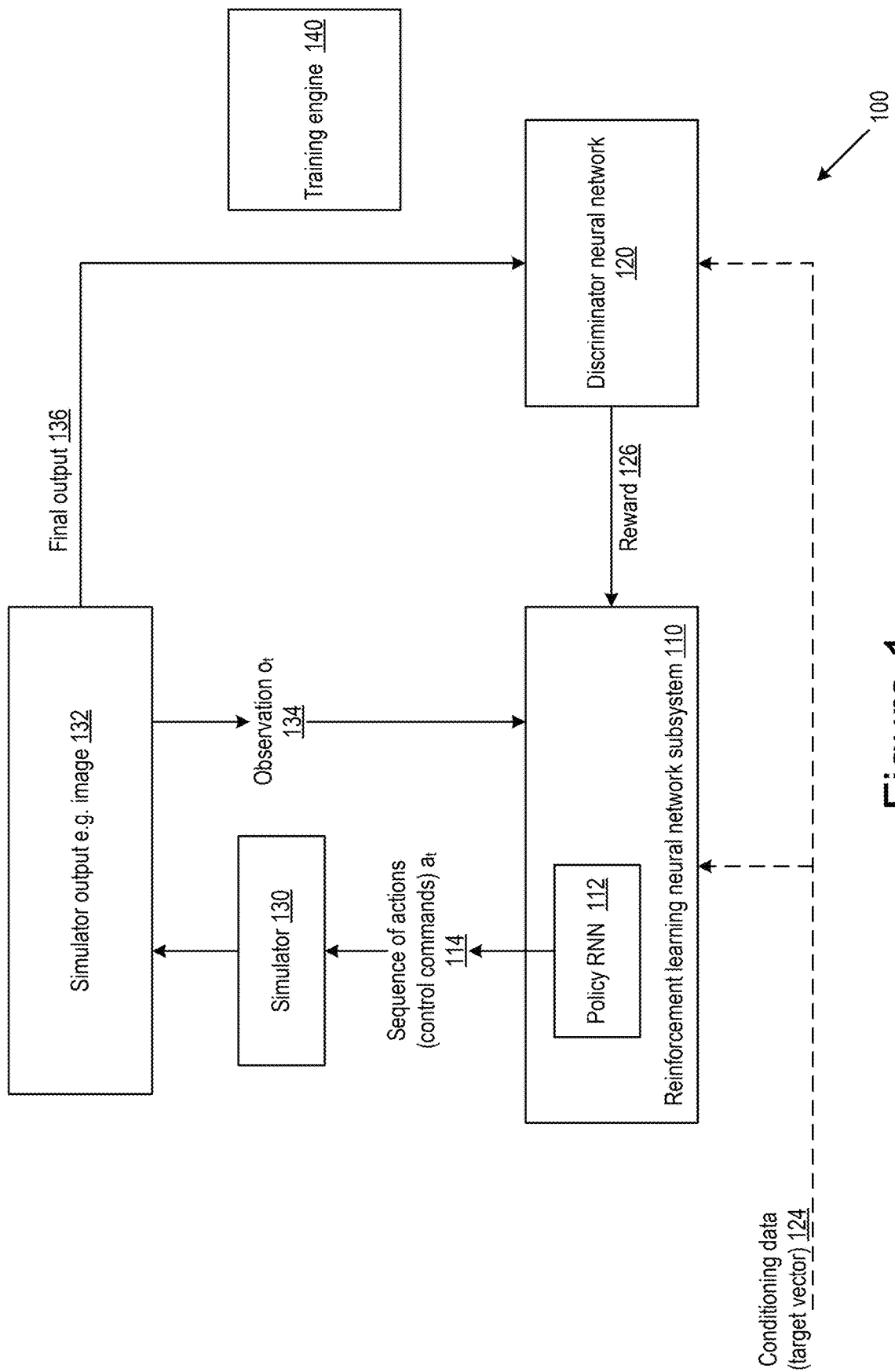
FIG. 1 shows an example generative adversarial neural network system.

FIG. 1 shows an example generative adversarial neural network system 100. In implementations this comprises a generator subsystem comprising a reinforcement learning neural network subsystem 110 coupled to a simulator 130. The reinforcement learning neural network subsystem 110 generates a sequence of actions 114, each action comprising one or more control commands to control the simulator 130 to generate simulator output 132. For example where the simulator is a 2D or 3D drawing or CAD design package the simulator output may be a 2D or 3D drawing or design. The reinforcement learning neural network subsystem 110 comprises an action selection neural network, in implementations a policy recurrent neural network (RNN) 112, for generating the sequence of actions. In some implementations, the reinforcement learning neural network subsystem receives observations 134 of the task as the task progresses, for example intermediate representations of the simulator output such as a partially complete drawing. In other implementations the reinforcement learning neural network subsystem lacks access to such intermediate observations. Optionally, in some implementations the policy RNN 112 may receive the last action as an input, as well as a most recent observation.

In implementations the policy RNN 112 provides an output which defines a distribution over possible actions at a time step. Thus the policy RNN 112 may generate a set of policy scores comprising numerical values used to select the action(s). The policy scores may define a respective probability value for each action of a set of possible actions at the time step. The actions(s) may be selected, for example, by sampling an action in accordance with the probability values or by choosing an action with a highest policy score.

A final observation of the output of simulator 136 after the simulation is complete, e.g. after N actions (control commands), is provided to a discriminator neural network 120. For example in some implementations the final output of the simulator may comprise a rendered image. The discriminator neural network 120 produces a discriminator output, i.e. a discriminator score, which represents a probability that the input to the discriminator, the final output from the simulator, is from a distribution represented by training data items from a training data set. In effect the discriminator neural network 120 produces an output which represents a difference between the final output from the simulator and the training data. This is used, as described later, as a reward 126 for the reinforcement learning neural network subsystem 110. Optionally one or more auxiliary rewards (which here includes penalties) may be generated prior to producing the final simulator output e.g. from the control commands, and for training the reinforcement learning neural network subsystem 110.

In some implementations the discriminator neural network 120 uses a Wasserstein or "Earth-Mover" distance metric of the difference between the distribution of the training data set and the distribution of the final simulator output—that is the discriminator is trained using this metric to distinguish between samples from the generator subsystem and samples from the training data. This can increase stability during training.

In some implementations the reinforcement learning neural network subsystem 110 and the discriminator neural network 120 can each be conditioned on conditioning data 124 such as a target vector specifying a target (final) simulator output. Thus categories of data items in the training data set may be labelled using the target vector and the system may be trained to generate a final simulator output corresponding to each of the categories, for example a particular graphical character if the categories label graphical characters. Alternatively the system may generate the simulator output unconditionally based on the training data items (the training procedure described later does not require aligned examples from the generator subsystem and training data).

The system includes a training engine 140 which operates to adjust parameters of the reinforcement learning neural network subsystem 110 and of the discriminator neural network 120 as described later, to encourage the final simulator output to match the training data items. A consequence of this is that the reinforcement learning neural network subsystem learns to generate a sequence of actions, i.e. control commands or instructions, for controlling the simulator to produce a final output which matches a training data item. These may be, for example, control commands for controlling a CAD program to produce a design, or for controlling a music or speech synthesis program to produce music or speech, or for controlling a vehicle to take a particular path. Once the system has been trained the training engine 140 and discriminator neural network 120 are no longer required and, if desired, the simulator may be replaced by an implementer e.g. a mechanical agent such as a robot or vehicle controlled by the control commands.

Figure 2:
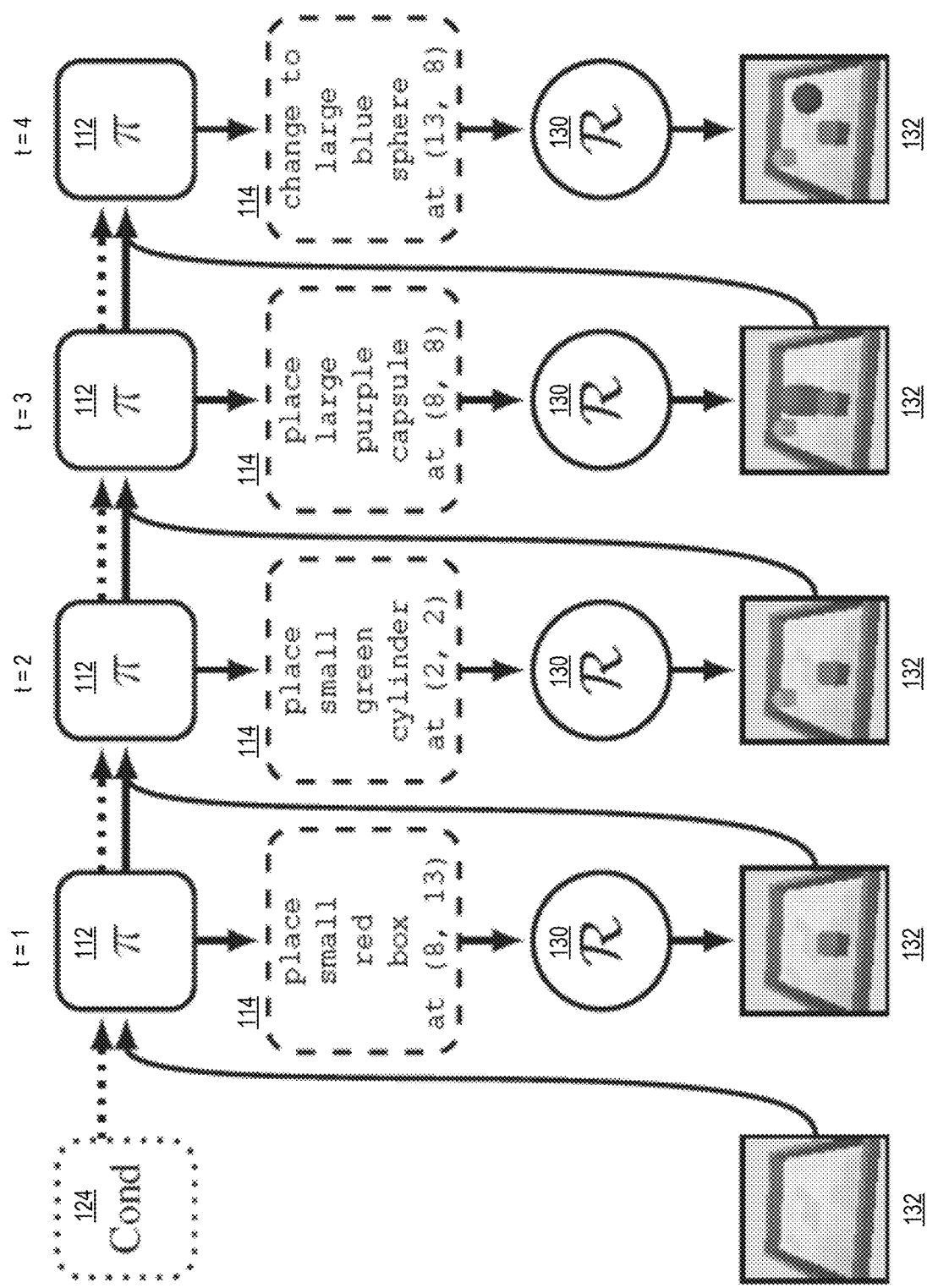
FIG. 2 illustrates generation of a sequence of instructions and the corresponding simulator output in the example system of FIG. 1.

FIG. 2 illustrates generation of a sequence of instructions and the corresponding simulator output. In this example the simulator 130 comprises a scene rendering program and at each time step t=1 . . . 4 the reinforcement learning neural network subsystem 110 has to decide on the object type, location, size and color of an object to add, move or change, and outputs an instruction accordingly. The instructions cause a 3D image to be rendered, as shown. In the example the policy RNN 112 receives the intermediate observations (renders), and uses these to adjust its action selection policy, but only receives a reward from the discriminator in the final step of execution.

Figure 3:
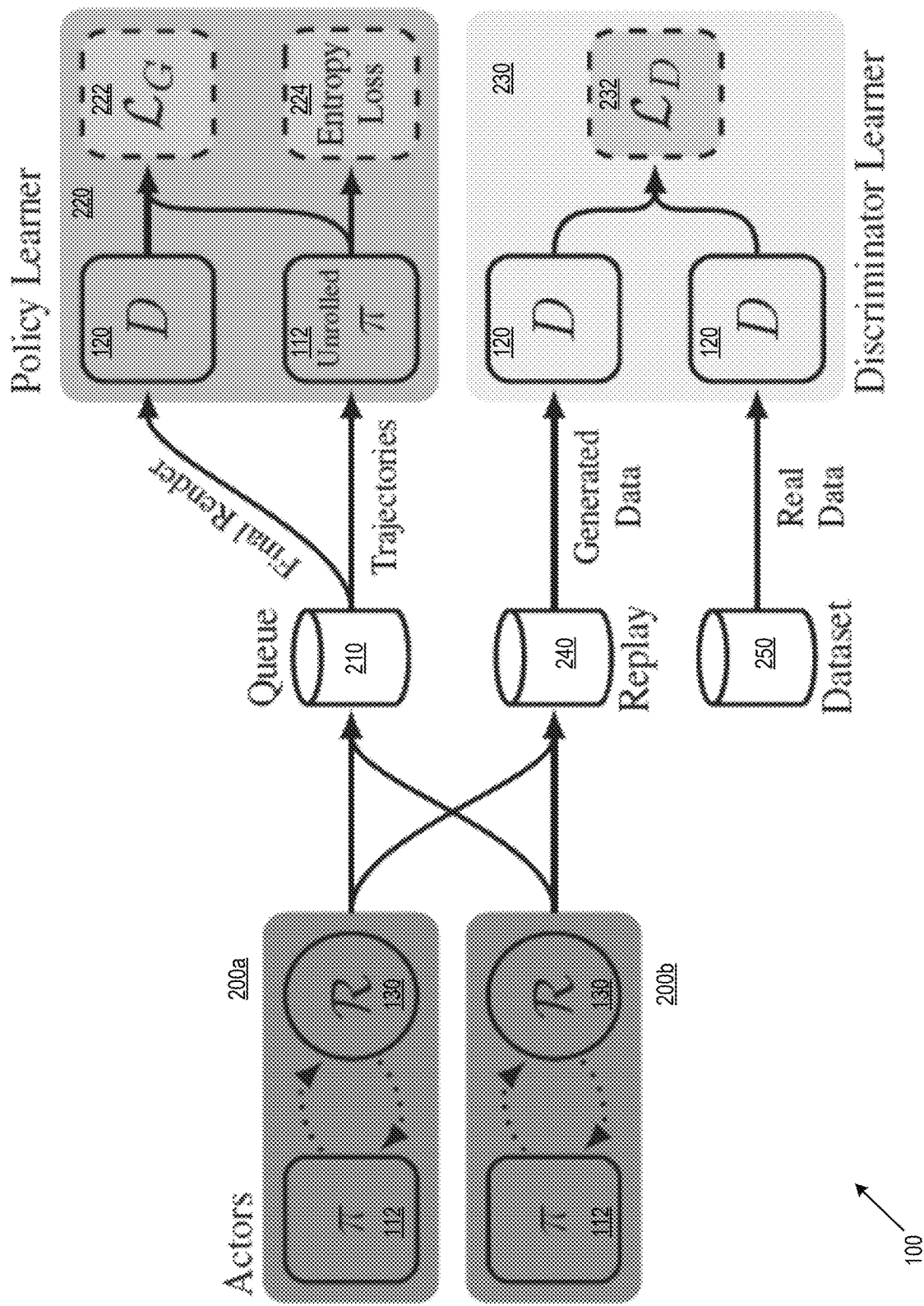
FIG. 3 shows one example implementation of the system of FIG. 1 using a distributed computing system.

Any of a range of reinforcement learning techniques may be implemented by the reinforcement learning neural network subsystem 110. FIG. 3 shows one example implementation of the system of FIG. 1 using a distributed computing system configured to implement a variant of the IMPALA reinforcement learning architecture, L. Espeholt et al., "IMPALA: Scalable Distributed Deep-RL with Importance Weighted Actor-Learner Architectures". In such an implementation each of a set of actors has a copy of an action selection neural network, i.e. an instance of policy RNN 112, which it uses to select actions according to a local behavior policy. In operation the parameters of the local copy of the action selection neural network are updated from an action selection neural network of a central learner, another instance of policy RNN 112. The local copy of the action selection neural network is then used to generate a trajectory of experience, which is passed to the central learner and there used to update the action selection neural network and also a value function (state value) neural network. Generating experience is decoupled from learning parameters of the action selection neural network and the value function neural network. Learning is off-policy because of the lag between generating the actions and updating the learner parameters and a "V-trace" algorithm is used which, in broad terms, adjusts parameters of the neural networks based on a ratio of a learner policy score and a behavior policy score for a selected action.

In FIG. 3 each of a set of actor computing units 200a,b comprises a respective policy RNN 112 coupled to a simulator 130, as previously described. A policy learner computing unit 220 maintains a central version of the policy RNN 112 with parameters which define the latest learner policy. A discriminator learner computing unit 230 assesses the similarity of the final simulator output to data items in the training data set, which may be provided in a data store 250.

A computing unit may be, e.g., a computer, a core within a computer having multiple cores, or other hardware or software, e.g., a dedicated thread, within a computer capable of independently perform operations. The computing units may include processor cores, processors, microprocessors, special-purpose logic circuitry, e.g., an FPGA (field-programmable gate array) or an ASIC (application-specific integrated circuit), or any other appropriate computing units. In some examples, the computing units are all the same type of computing unit. In other examples, the computing units may be different types of computing units. For example, one computing unit may be a CPU while other computing units may be GPUs, TPUs or the like.

Each of the actor computing units maintains a local copy of the policy RNN 112, with parameters obtained from the learner computing unit 220 prior to generating a trajectory of experience for training the learner computing unit 220. At each of time steps t=1 . . . N the actor computing unit copy of the policy RNN 112 receives an observation of the environment e.g. an output of its associated simulator, and outputs policy scores for possible actions, i.e. control commands for the simulator, one or more of which is selected to generate the control command(s) for the time step.

In implementations a trajectory of experience comprises the observation and action(s) for each time step, as well as a policy score for the selected action(s) at the time step it may also comprise an initial state of the policy RNN 112. The trajectories of experience are produced asynchronously by the actor computing units and are stored in a queue 210, which acts as an experience buffer for the policy learner computing unit 220. In implementations the final simulator output is stored in a replay buffer 240, for optimizing the discriminator learner computing unit 230. In implementations a final reward for the policy learner computing unit 220 is generated from the final observation in a trajectory of experience, i.e. at t=N, by the discriminator neural network 120. The final reward may be determined by the discriminator neural network 120 and stored in the queue 210 or it may be determined by the policy learner computing unit 220 when needed. The trajectory of experience may optionally include one or more auxiliary rewards, e.g. rewards prior to t=N, as described later.

The policy learner computing unit 220 is trained off-policy using the generated trajectory of experiences and the reward(s), e.g. by optimizing a generator objective $L_G$ 222 using stochastic gradient descent. The generator objective $L_G$ may be chosen to maximize the reward assigned to the final simulator output by the discriminator neural network 120, i.e. so that the final simulator output matches a distribution of the training data set, optionally conditioned on conditioning data 124. Optionally the generator objective $L_G$ may be augmented with an entropy regularization term 224 to encourage exploration.

The discriminator learner computing unit 230 obtains examples of the final observations e.g. from replay buffer 240, that is examples of the final outputs of the simulators 130 controlled by the actor computing units 200. The discriminator learner computing unit 230 also obtains random examples from the training data set e.g. from data store 250, optionally conditioned e.g. categorized according to conditioning data 124. The discriminator learner computing unit 230 is trained by optimizing a discriminator objective $L_D$ 232 using stochastic gradient descent.

In FIG. 3 the three instances of the discriminator neural network 120 are the same neural network, shown three times for ease of illustration. For example the policy learner computing unit 220 includes an instance of the discriminator neural network 120 to illustrate that the final reward used when training the policy RNN 112 may be determined by applying the latest version of the discriminator neural network 120 to the final simulator output from the experience buffer, queue 210.

In implementations the policy RNN 112 is larger than the discriminator neural network 120 (which may comprise a convolutional neural network). The replay buffer allows the discriminator learner computing unit 230 to optimize at a higher rate than the policy RNN 112, by decoupling updates to the discriminator neural network 120 and policy RNN 112. This can improve performance of the system.

Any of a range of GAN (Generative Adversarial Network) objectives may be implemented by the discriminator neural network 120. In one implementation a Wasserstein GAN discriminator is used as described in Gulrajani et al., "Improved Training of Wasserstein GANs", arXiv: 1704.00028. In this implementation the discriminator objective may be given by $$L_D = D(\tilde{x}) + D(x) + R$$

where $\tilde{x}$ is the final simulator output and x is a data item from the training set. In implementations a regularization term R is used to softly constrain D to stay in a set of Lipschitz continuous functions, e.g. $R = \lambda(\|\nabla_{\hat{x}} D(\hat{x})\|_2 - 1)^2$ where $\lambda$ is a constant e.g. $\lambda = 10$ and $\hat{x} = \epsilon x + (1-\epsilon)\tilde{x}$ and $\epsilon$ is a random number in the range [0,1]. $L_D$ is defined up to an additive constant and in implementations this ambiguity may be removed by encouraging D(x) to be close to 0 on average for an input x which is sampled from an average of the generated and training distributions, for example by adding a penalty such as a loss function component dependent upon $$\frac{1}{2}\tilde{x} + \frac{1}{2}x.$$

In one implementation the generator objective $L_G$ may be given by $$L_G = -\sum_{t=1}^{N} \log \pi(a_t)[R_t - V(s_t)]$$

where $a_t$ is the action selected at time t, $\pi(a_t)$ is the policy score for the selected action, and $V(s_t)$ is an approximation to the value function which depends on the recurrent state $s_t$ of the policy RNN 112. In practice $V(s_t)$ may be provided by a value function neural network. This may be implemented as a separate head on policy RNN 112, thus sharing some parameters with policy RNN 112. $R_t$ is an estimate of the return at time step t, and may be determined from $$R_t = \sum_{t}^{N} r_t$$

where $r_t$ is the reward at time t. The reward may be given by $$r_t = \begin{cases} 0, & t < N \\ D(\tilde{x}), & t = N \end{cases}$$

Optionally the reward may include one or more auxiliary rewards, e.g. for t<N. These may depend upon the intermediate simulator output and/or the commands used to generate that output e.g. for a time step t, and may be chosen according to the specific application of the system. Merely by way of example, a simulator comprising a drawing program may be encouraged to draw in a single continuous motion if a negative auxiliary reward (auxiliary penalty) is provided for starting a continuous sequence of strokes.

As previously described, the generator objective $L_G$ may also include an entropy bonus. For example, the entropy bonus may be given by:

$$-\sum_{a \in A} \pi(a) \cdot \log(\pi(a))$$

where A represents the set of possible actions and $\pi(a)$ represents the learner policy score for action a.

To implement conditional generation of the actions the conditioning data 124 is used to provide a conditioning input to policy RNN 112 and to provide a target data item to the discriminator neural network 120. For example the conditioning data might comprise a target vector comprising a target data item such as a target image. In this case the target data item may replace the example data items from the training data set. Alternatively the conditioning data might comprise a target vector which indexes a training data item or category of training data item e.g. in data store 250.

Figure 4A:
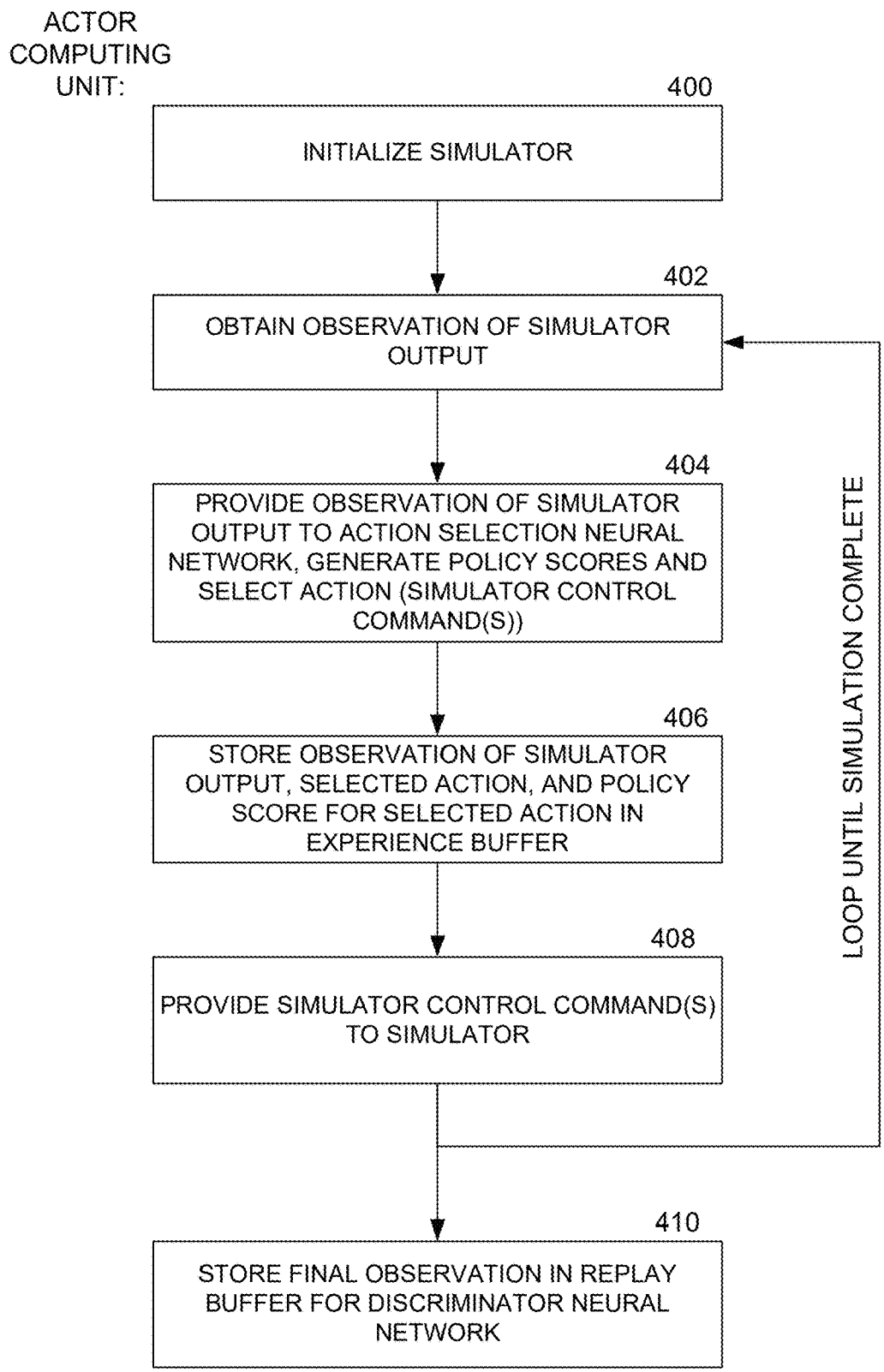
FIGS. 4a-4c show flow diagrams of example processes for training the system of FIG. 1.
Figure 4B:
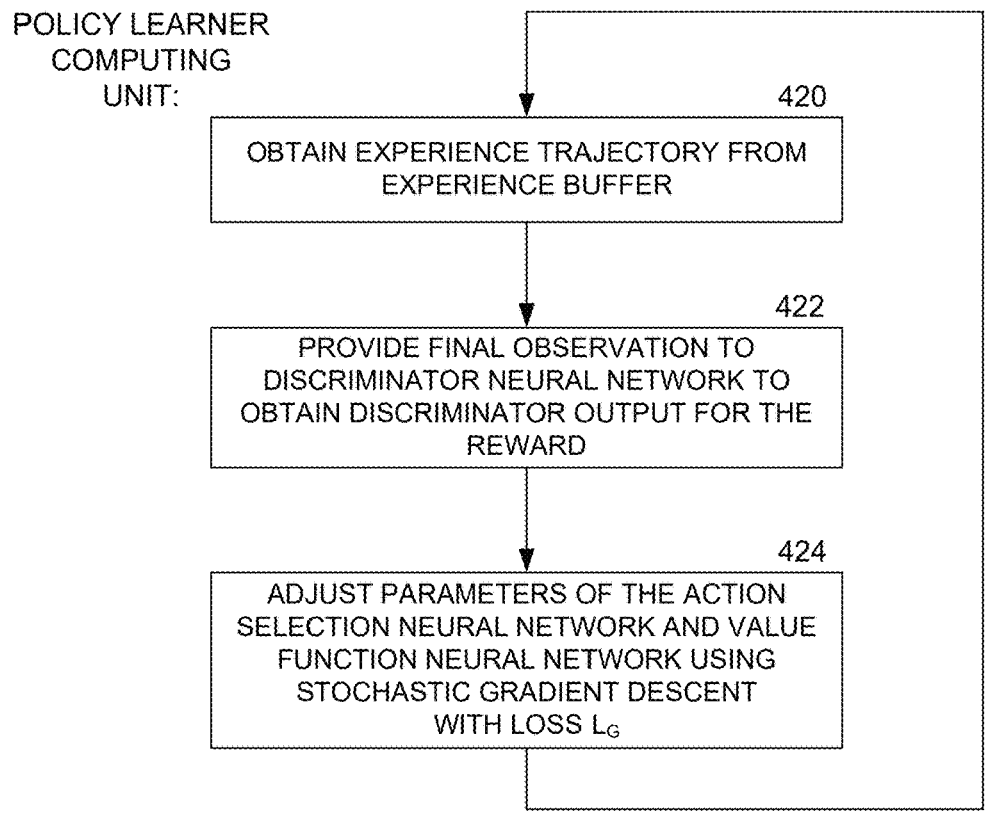
Figure 4C:
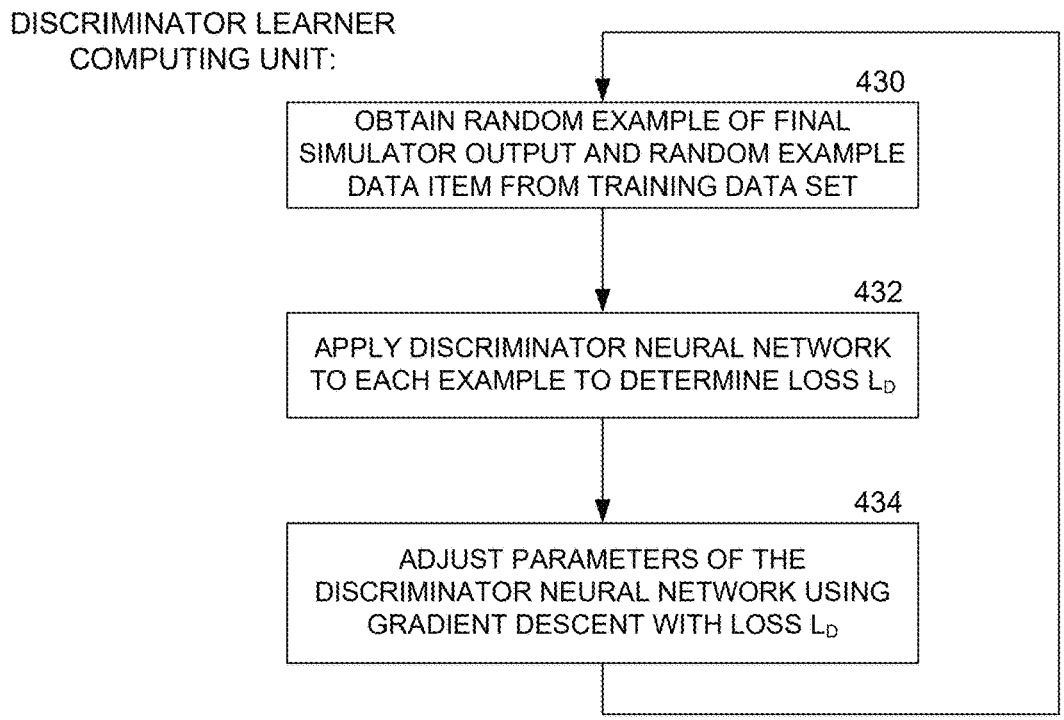

FIGS. 4*a* to 4*c* show flow diagrams of example training processes for the system of FIGS. 1-3, which may be implemented under control of training engine 140. These illustrate a training process for a distributed system with multiple actors, but it is not necessary to use a distributed system or multiple actors and in other implementations only a single actor may be present.

FIG. 4*a* shows a training process which may be implemented on each of the set of actor computing units 200*a,b*. At step 400 the simulator is initialized to a starting condition, for example a clean canvass for a drawing program. Then the process obtains an observation of the simulator output (402) and provides this to the action selection neural network i.e. to policy RNN 112.

Policy RNN 112 generates one or more policy scores for each available action, which action may comprise one or more simulator control commands, and an action is selected using the policy scores as previously described (404). The observation of the simulator output, the action i.e. the selected simulator control command(s), and the policy score(s) for the action, are then stored in the experience buffer, queue 210 (406). Optionally any auxiliary rewards, for example based on the simulator control command(s), are also stored.

The selected simulator control commands are provided to the simulator (408). The process then loops to obtain the next simulator output (402) and continues until the simulation is complete, e.g. after N time steps. When the simulation is complete the final observation, i.e. the final simulator output, is stored in the replay buffer 240 for training the discriminator neural network (410).

FIG. 4*b* shows a training process which may be implemented on the policy learner computing unit 220. The policy learner computing unit 220 obtains a trajectory of experience from the experience buffer (420), i.e. from queue 210. The final observation of the trajectory, i.e. the final simulator output, is provided to the discriminator neural network 120 to obtain a discriminator output, i.e. a discriminator score, e.g. in the range [0,1]. This is used to define a reward as described above (422).

The process then adjusts the parameters of the reinforcement learning neural network subsystem 110 using any suitable reinforcement learning technique with the discriminator score as a reward. For example in some implementations the above described an IMPALA-type reinforcement learning technique is used, backpropagating a gradient of the generator objective (loss) $L_G$ 222 using stochastic gradient descent to update parameters of the action selection neural network, policy RNN 112, and value function (state value) neural network.

The process then loops to obtain another experience trajectory (420) and continues until a termination criterion is met. The termination criterion may comprise, for example, a specified number of iterations or exceeding a threshold value of a performance metric. Optionally the process may then output a set of parameters (weights) which define the trained policy RNN 112, so that this may be used independently.

FIG. 4b shows a training process which may be implemented on the discriminator learner computing unit 230. The process obtains a random example of the final simulator output from the replay buffer 240 and a random training data item from the training data set e.g. from data store 250 (step 430), and then applies the discriminator neural network 120 to each of these obtain a respective discriminator output $D(\tilde{x})$, $D(x)$ (step 432). These are then used to determine the discriminator objective (loss) $L_D$ 232 and a gradient of this is backpropagated using stochastic gradient descent to update parameters of the discriminator neural network 120 (step 434).

Figure 5A:
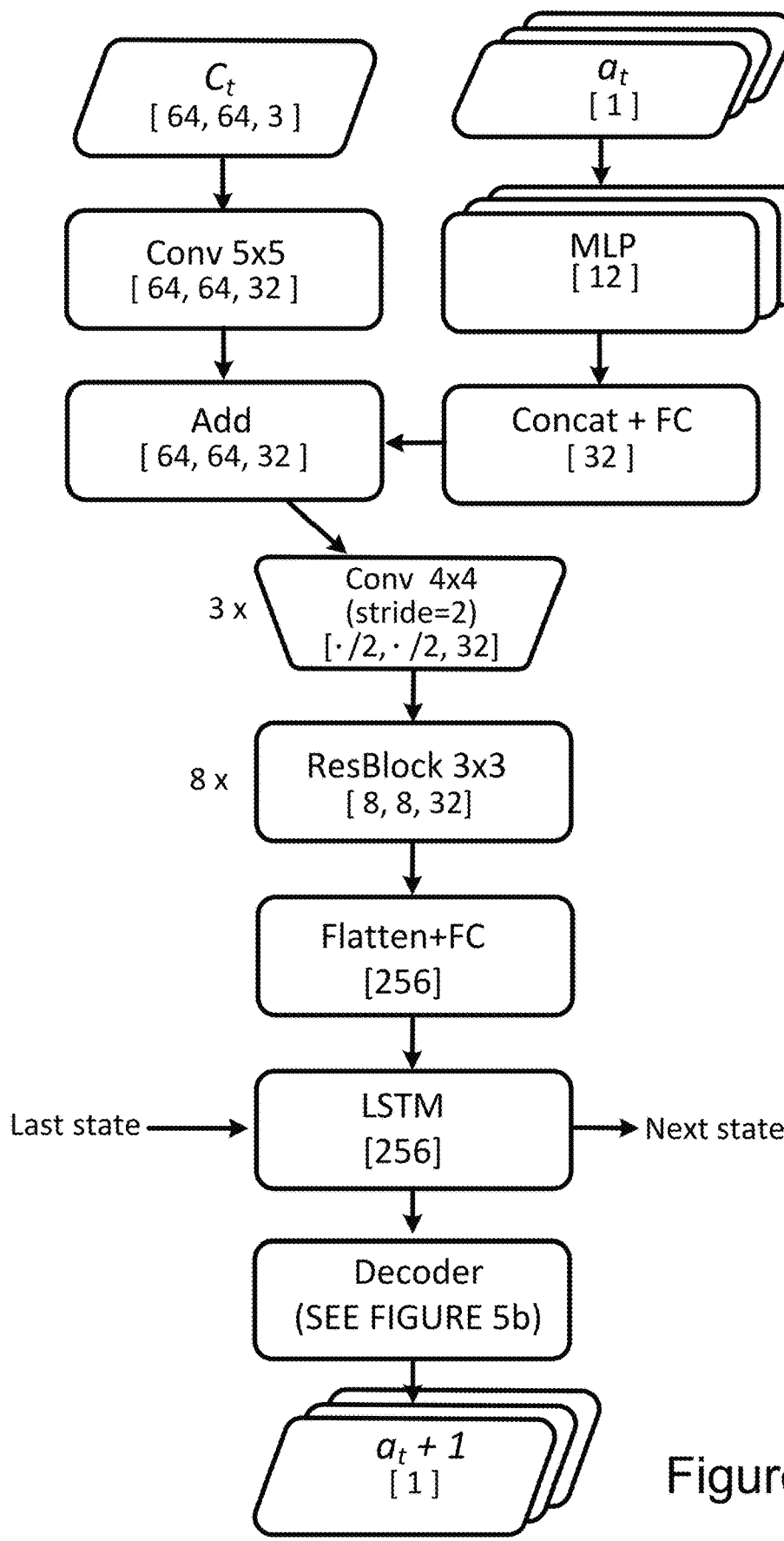
FIGS. 5a and 5b show details of an example implementation of a policy recurrent neural network for the system of FIG. 1.

Many different architectures may be used for the action selection policy RNN 112. FIG. 5a shows, merely by way of example, one possible architecture for policy RNN 112.

In broad terms this example policy RNN comprises one or more convolutional layers coupled to one or more RNN layers, coupled to a decoder. The decoder may generate action tuples where a component of the action tuple is generated by sampling from a categorical distribution with one or more parameters determined by a hidden state vector of the RNN layer(s). The decoder may be an autoregressive decoder. Such a policy RNN is particularly adapted to processing observations of images, renderings, CAD drawings and other similar 2D or 3D representations.

In FIG. 5a FC refers to a fully-connected layer, Conv refers to a convolutional layer, ResBlock refers to a residual block, MLP refers to a multilayer perceptron, and LSTM refers to a long short-term memory recurrent layer; [ ] indicate dimensions of the output tensors; rectified linear unit (ReLU) activations (not shown) are present between the layers. The LSTM layer produces a hidden vector $z_0$ for generating the action, e.g. by serving as a seed for an action sampling process.

Figure 5B:
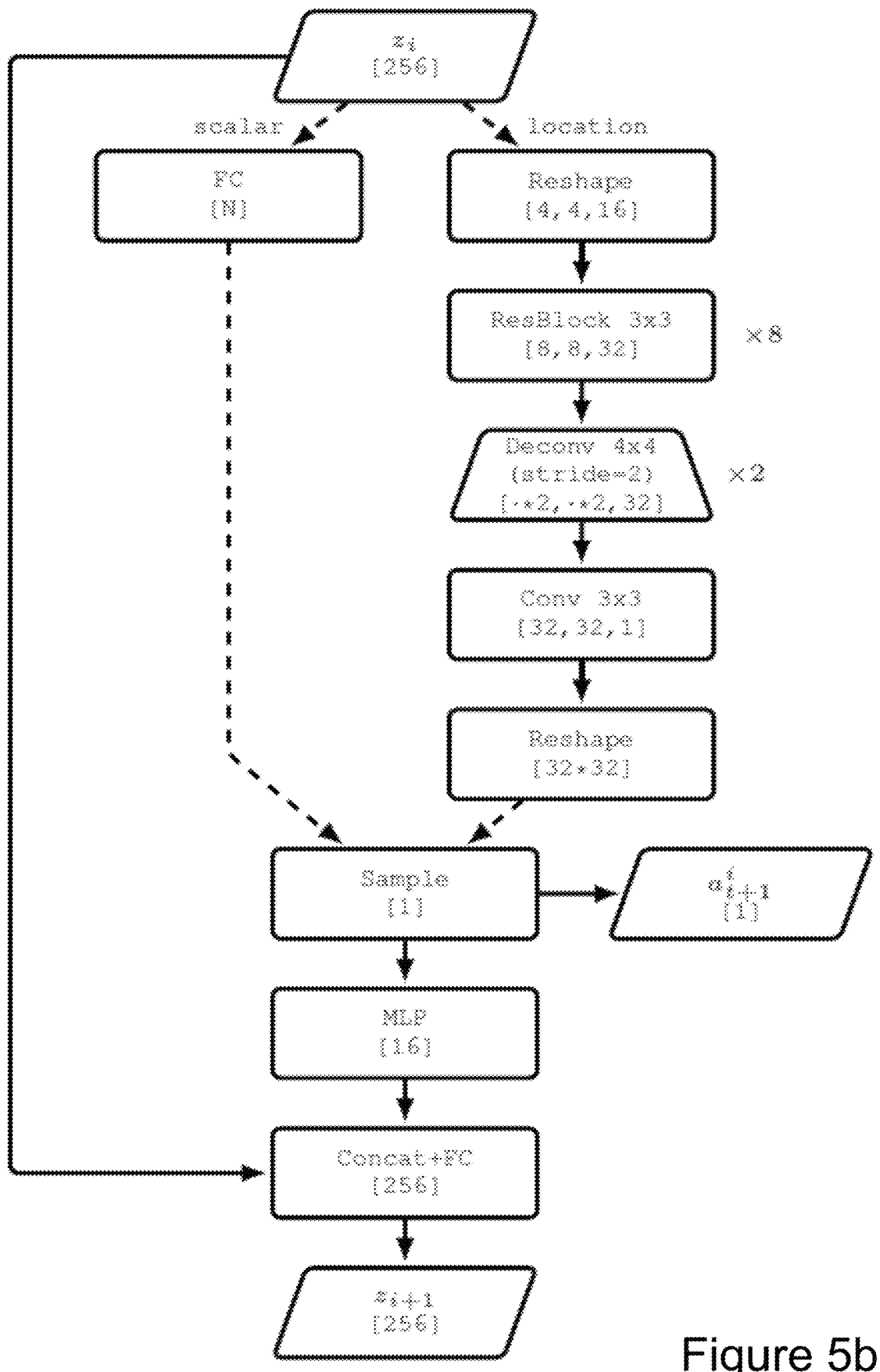

The example policy RNN of FIG. 5a is suitable for use with an image input, for example from a drawing program. In the example the policy RNN 112 receives a current observation or canvass $C_t$, and the action $a_t$ which resulted in this. The next action, $a_{t+1}$, is provided by the output from a decoder, for example as shown in FIG. 5b. The action may comprise a tuple of control commands, for example pen start, end and control locations defining a Bezier curve, pen size, pen color, and the like.

One example of a decoder which may be used in the policy RNN of FIG. 5a is an autoregressive decoder, an example of which is shown in FIG. 5b. In this example decoder each component i of the action tuple $$a_{t+1}^i$$

is sampled from a categorical distribution whose parameters are computed as a function of $z_i$. Where $$a_{t+1}^i$$

is a scalar, e.g. pen size, $z_i$ may be processed by a fully connected later as shown; where $$a_{t+1}^i$$

is a location $z_i$ may be processed by one or more deconvolutional or transpose convolutional layers, and optionally other layers. Once $$a_{t+1}^i$$

is sampled an updated hidden vector $z_{i+1}$ may be obtained by combining $$a_{t+1}^i$$

with $z_i$. The procedure may be repeated as necessary to generate an entire action tuple.

Figure 6:
FIG. 6 shows example output images from a trained system of the type shown in FIG. 1.

FIG. 6 shows example output images from a trained system of the type shown in FIG. 1, with a policy RNN as shown in FIGS. 5a and 5b controlling a drawing program. The system was trained to provide a sequence of commands to a drawing program to perform the task of drawing characters from the Omiglot character set. Thus the Figure shows examples from the Omiglot character set with the ground truth on the right and the reconstruction on the left. In the FIG. 6 examples the policy RNN is conditioned on the target image. However once trained the system is able to draw other similar characters which may be specified by a target vector provided to the system on which the sequence of commands may be conditioned.

Figure 7:
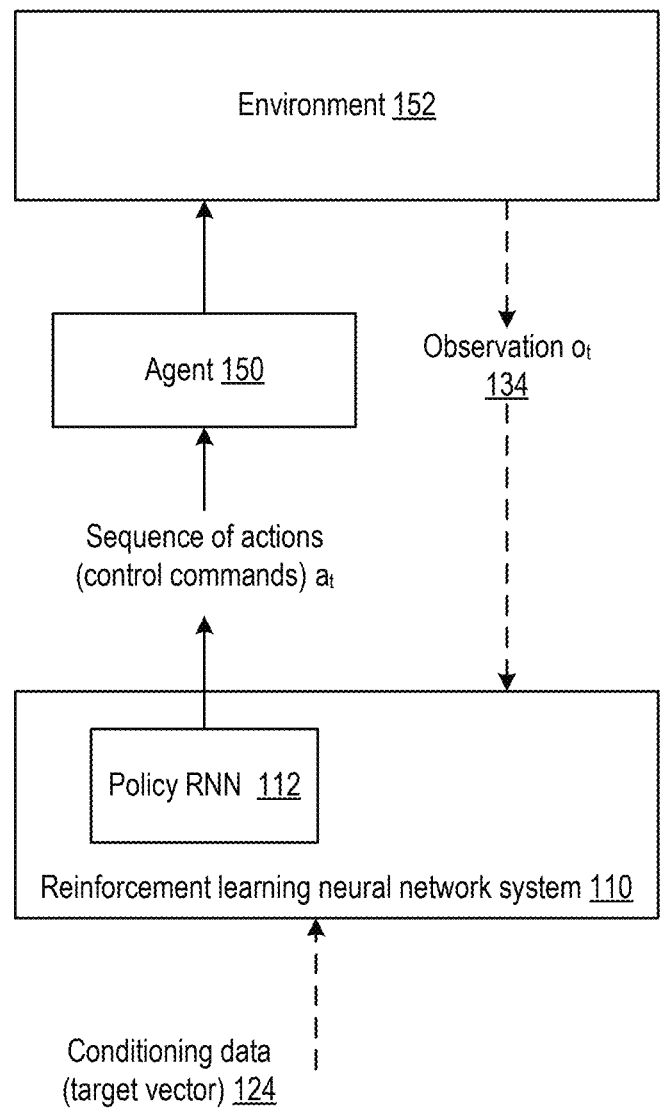
FIG. 7 shows an example use of the trained reinforcement learning neural network subsystem of FIG. 1 to control the behavior of a mechanical agent.

FIG. 7 shows an example of the trained reinforcement learning neural network subsystem 110 in use to control the behavior of an agent 150, which may be termed an interpreter, optionally with the controlled behavior conditioned on a target vector or other conditioning data 124. Here the agent may be a mechanical agent such as a robot or a vehicle e.g. a car or aircraft. The agent may be controlled to perform a task specified by the conditioning data, for example in the case of a robot to assemble components or in the case of a vehicle to control the vehicle to take a particular course. Alternatively the agent may be a computer program such as a program to produce an image i.e. pixel values for an image, or audio i.e. time and/or frequency domain data defining a speech waveform, and the agent may be controlled to generate the image or a sound.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices storing instructions that when executed by the one or more computers cause the one or more computers to perform operations for synthesizing programs for generating images, the operations comprising:
    using a policy neural network to, at each of a sequence of time steps, select one or more actions for generating an image to be performed, wherein each action is a respective command to a graphics software configured to generate an image;
    controlling the graphics software using the respective commands to cause the graphics software to generate a graphics output comprising an image;
    processing the graphics output generated by the graphics software using a discriminator neural network to produce a discriminator output that indicates whether the graphics output is from a set of training data comprising images or was generated by the graphics software; and
    training the policy neural network using a reinforcement learning procedure according to a reward signal determined from the discriminator output; and
    training the discriminator neural network according to the discriminator output.

2. The system of claim 1 wherein the graphics software is a non-differentiable graphics engine.

3. The system of claim 1 wherein the policy neural network has an internal state, the operations further comprising:
    determining an estimated return from the internal state using a value function neural network, and
    wherein training the policy neural network comprises updating parameters of the policy neural network using the estimated return.

4. The system of claim 1 wherein training the policy neural network comprises updating parameters of the policy neural network using stored trajectories from an experience buffer that stores trajectories from graphics outputs generated by a plurality of actors.

5. The system of claim 1, the operations further comprising storing the graphics output in a reply buffer, and wherein the discriminator neural network is configured to sample from the replay buffer to provide the discriminator output.

6. The system of claim 1 wherein training the discriminator neural network comprises updating parameters of the discriminator neural network so that the discriminator output is dependent upon a first Wasserstein distance between the graphics output and training data.

7. The system of claim 1 wherein the reward signal further comprises an auxiliary reward dependent upon the selected one or more actions.

8. The system of claim 1 wherein the policy neural network has an input to receive a target vector defining a target for the graphics output, and wherein the one or more actions are selected conditionally upon the target vector.

9. The system of claim 8, the operations further comprising providing the target vector as the training data for the discriminator neural network.

10. The system of claim 1 wherein the graphics software comprises a programmable signal generator, and wherein the selected one or more actions for the sequence of time steps comprise programming actions to control the programmable signal generator to provide a graphics output comprising a signal generated according to the programming actions.

11. A method performed by one or more computers and for synthesizing programs for generating images, the method comprising:
    using a policy neural network to, at each of a sequence of time steps, select one or more actions for generating an image to be performed, wherein each action is a respective command to a graphics software configured to generate an image;
    controlling the graphics software using the respective commands to cause the graphics software to generate a graphics output comprising an image;
    processing the graphics output generated by the graphics software using a discriminator neural network to produce a discriminator output that indicates whether the graphics output is from a set of training data comprising images or was generated by the graphics software; and
    training the policy neural network using a reinforcement learning procedure according to a reward signal determined from the discriminator output; and
    training the discriminator neural network according to the discriminator output.

12. The method of claim 11 wherein the graphics software is a non-differentiable graphics engine.

13. The method of claim 11 wherein the policy neural network has an internal state, the method further comprising:
    determining an estimated return from the internal state using a value function neural network, and wherein training the policy neural network comprises updating parameters of the policy neural network using the estimated return.

14. The method of claim 11 wherein training the policy neural network comprises updating parameters of the policy neural network using stored trajectories from an experience buffer that stores trajectories from graphics outputs generated by a plurality of actors.

15. The method of claim 11, the method further comprising storing the graphics output in a reply buffer, and wherein the discriminator neural network is configured to sample from the replay buffer to provide the discriminator output.

16. One or more non-transitory computer storage media storing instructions that when executed by one or more computers cause the one or more computers to perform operations for synthesizing programs for generating images, the operations comprising:

using a policy neural network to, at each of a sequence of time steps, select one or more actions for generating an image to be performed, wherein each action is a respective command to a graphics software configured to generate an image;

controlling the graphics software using the respective commands to cause the graphics software to generate a graphics output comprising an image;

processing the graphics output generated by the graphics software using a discriminator neural network to produce a discriminator output that indicates whether the graphics output is from a set of training data comprising images or was generated by the graphics software; and training the policy neural network using a reinforcement learning procedure according to a reward signal determined from the discriminator output; and training the discriminator neural network according to the discriminator output.

17. The non-transitory computer storage media of claim 16 wherein the graphics software is a non-differentiable graphics engine.

18. The non-transitory computer storage media of claim 16 wherein the policy neural network has an internal state, the operations further comprising:

determining an estimated return from the internal state using a value function neural network, and wherein training the policy neural network comprises updating parameters of the policy neural network using the estimated return.

19. The non-transitory computer storage media of claim 16 wherein training the policy neural network comprises updating parameters of the policy neural network using stored trajectories from an experience buffer that stores trajectories from graphics outputs generated by a plurality of actors.

20. The non-transitory computer storage media of claim 16, the operations further comprising storing the graphics output in a reply buffer, and wherein the discriminator neural network is configured to sample from the replay buffer to provide the discriminator output.

* * * * *